(12) United States Patent
Tadano

(10) Patent No.: US 6,201,358 B1
(45) Date of Patent: Mar. 13, 2001

(54) WAVEFORM CORRECTION USING INDUCTANCE-CONTROLLABLE INDUCTOR

(75) Inventor: Taro Tadano, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/143,541

(22) Filed: Aug. 28, 1998

(51) Int. Cl.$^7$ ........................................ G09G 1/04
(52) U.S. Cl. ........................ 315/370; 315/399; 315/400
(58) Field of Search ................................. 315/370, 400, 315/399

(56) References Cited

U.S. PATENT DOCUMENTS

| | | | |
|---|---|---|---|
| 3,610,902 | * 10/1971 | Rahenkamp et al. | 235/152 |
| 3,968,402 | 7/1976 | Sahara et al. | |
| 4,206,388 | 6/1980 | Ishigaki et al. | |
| 4,242,714 | 12/1980 | Yoshida et al. | |
| 4,409,523 | 10/1983 | Yasumura | |
| 4,551,655 | * 11/1985 | Timmermans et al. | 315/370 |
| 4,868,464 | 9/1989 | Watanabe et al. | |
| 5,260,628 | 11/1993 | Kawaberi et al. | |
| 5,349,274 | 9/1994 | Watanabe et al. | |
| 5,473,224 | * 12/1995 | Tsujihara et al. | 315/368.18 |
| 5,485,062 | 1/1996 | Sahara et al. | |
| 5,939,843 | * 8/1999 | Kimoto et al. | 315/368.12 |
| 6,013,989 | * 1/2000 | Lee | 315/371 |

* cited by examiner

*Primary Examiner*—Seungsook Ham
*Assistant Examiner*—Shun Lee
(74) *Attorney, Agent, or Firm*—Ronald P. Kananen; Rader, Fishman & Grauer

(57) ABSTRACT

A waveform correction system using inductance-controllable inductors suitable for use in the horizontal sweep circuits of televisions and computer displays includes a linearity correction coil (18) that is connected in parallel to the horizontal linearity coil (12) of the sweep circuit and used to selectively alter the inductance of the horizontal linearity coil (12) to correct for non-linearities in the horizontal sweep waveform. The linearity correction coil (18) has an input coil (20) cross-coupled to an output coil (22) through a core (24) with the output coil (22) connected in parallel with the horizontal linearity coil (12). The input coil (20) is connected between a control node (26) and circuit ground. A controller (28), in the form of a programmed microprocessor, PLA, or similar device, includes a memory (32) into which digital correction factors are stored as a function of the forward left-to-right scan position of the electron beam as it sweeps from the left side to the right side of the display screen. As the electron beam sweeps left to right, a control current through the input coil (20) of the linearity correction coil (18) effects waveform correction.

16 Claims, 2 Drawing Sheets

WAVEFORM CORRECTION USING INDUCTANCE-CONTROLLABLE INDUCTOR

BACKGROUND OF THE INVENTION

The present invention relates to waveform correction or control using inductance-controllable inductors and, more particularly, to the control or correction of waveforms used to drive raster-type CRT displays and, still more particularly, to the control or correction of waveforms used to drive the horizontal sweep of raster-type displays and monitors such as those used in televisions and computer displays.

Various systems have been developed to control the electron beam in cathode-ray tubes (CRT's). The classic system utilizes a set of coils, i.e., the deflection yoke, mounted on the neck of the tube to control both the horizontal and vertical movement of the electron beam. In general, horizontal control is effected by successively deflecting the electron beam from the left to the right at a selected frequency with the vertical position of the beam synchronously controlled with successive horizontal sweeps. The circuits that effect horizontal control, known generically as the horizontal sweep circuits in the television industry and as the horizontal scan circuits in the computer monitor industry, generate a recurring waveform (typically having a sawtooth or sawtooth-like form) that, in turn, drives the deflection coils to sweep the electron beam from the left to the right. Because of frequency-dependent power losses in the deflection yoke, non-linearities in the transfer characteristics of the output power transistors, and other error sources in the horizontal drive electronics (including capacitive and inductive effects), certain non-linearities are introduced into the system that cause distortion in the displayed image. The distortion can take the form, for example, of a displayed image that is wider at the top and narrower at the bottom, pincushion effects by which the center portion of the display appears narrower than the upper or lower portions, and/or foldback. As displays have become larger (both in the case of television receivers and computer displays) and as horizontal sweep frequencies have become higher (in computer monitors), these non-linearities become more prominent and increase the need for correction of the resulting distortion/non-linearity errors in the displayed image.

Over the decades, various types of circuits and devices have been developed to compensate for the intrinsic non-linearities. These prior art circuits have included switched-inductor devices that vary the inductance of an LC circuit at selected portions in the waveform to correct for distortion in the displayed image. Historically, television displays and computer displays have operated at a single horizontal scanning frequency; accordingly, the design parameters for effecting waveform compensation or correction have been relatively straightforward. In recent years, the trend in the design of computer monitors has been in the direction of higher resolution displays that can effect horizontal scanning at one of several possible scanning frequencies, including frequencies in the area of 70–80 KHz. This trend has exacerbated the problem of waveform correction or compensation since a wider range of inductance is required in the waveform correction circuitry.

SUMMARY OF THE INVENTION

In view of the above, it is an object of the present invention, among others, to provide waveform correction or control using a controllable-inductance inductor.

It is another object of the present invention to provide waveform correction or control for CRT's and other raster-type displays using an controlled-inductance inductor by which the inductance thereof can be varied over a wide range.

It is still another object of the present invention to provide waveform correction for the horizontal drive waveform of CRT's using a DC inductance-controlled inductor to vary the inductance thereof during selected portions of the horizontal drive waveform to achieve linearity.

It is still another object of the present invention to provide waveform correction for the horizontal drive waveform of CRT's using a DC inductance-controlled inductor to vary the inductance thereof during selected portions of the horizontal drive waveform under the control of a stored-program processor to achieve linearity.

In view of these objects, and others, the present invention provides for waveform correction/compensation using an inductance-controllable inductor suitable for use in CRT-type displays such as those used in televisions and multi-scan computer monitors. An inductor is placed in circuit with the waveform drive circuits of raster-type displays and in circuit with a compensation inductor having cross-coupled input and output coils with the flow of current in the input coil affecting the inductance of the output coil and the shape of the resulting waveform. A stored-programmed controller, such as a microprocessor, provides control values to the input coil to change inductance as desired throughout the waveform. In the case of computer monitors that can operate at different scanning frequencies, the microprocessor accesses different sets of correction factors as a function of the monitor scan frequency.

The present invention advantageously provides waveform correction using an inductance-controllable inductor to effect control, compensation, and linearity correction of the waveforms used in driving raster-type television displays and computer-type monitors.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
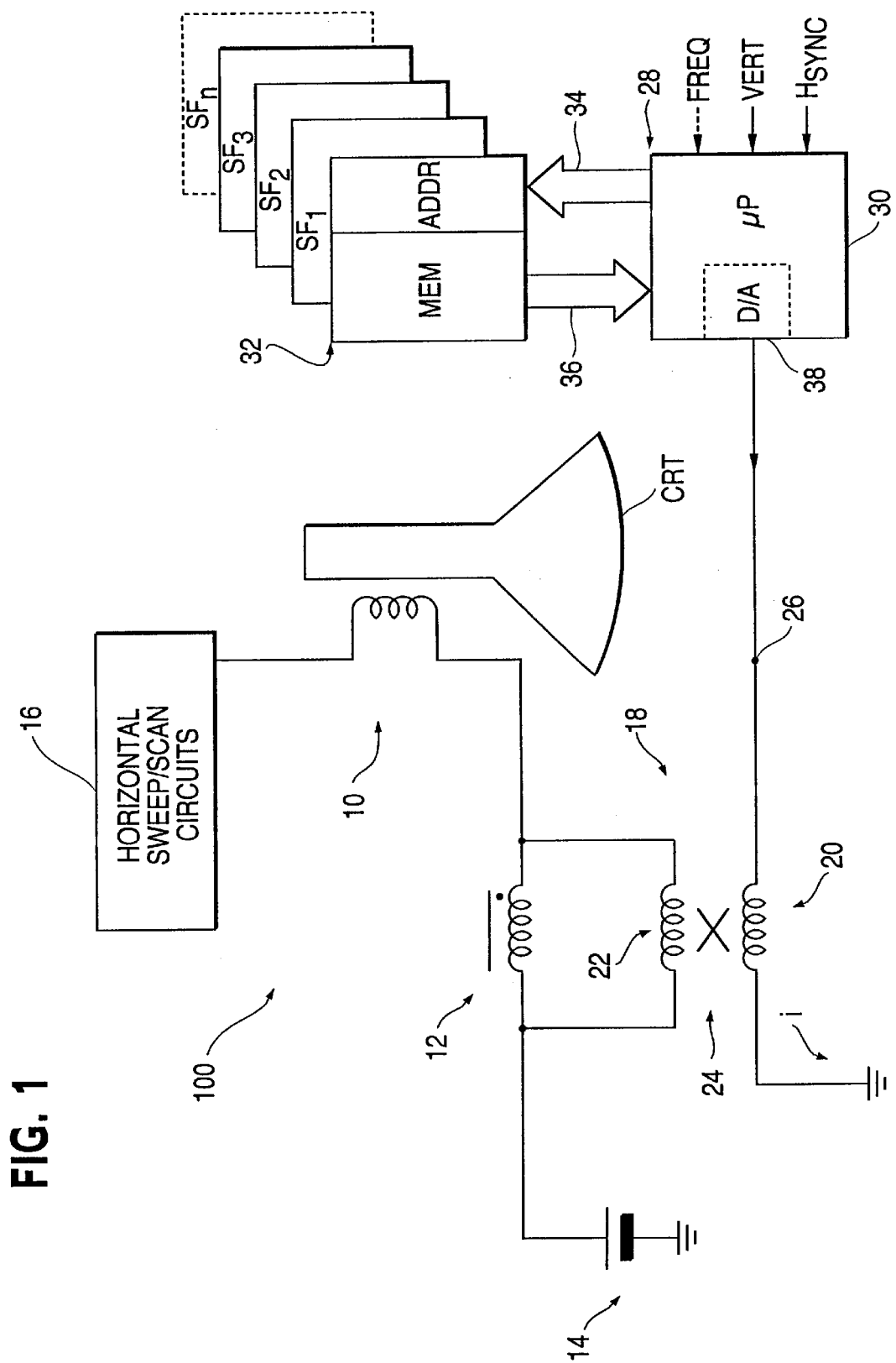
FIG. 1 is a circuit diagram of horizontal linearity control circuit in accordance with the present invention.

A horizontal linearity correction circuit using a current-controllable inductor in accordance with the present invention is shown in FIG. 1 and designated generally therein by the reference character 100. As shown, the circuit 100 includes a deflection yoke 10 that is typically mounted on the neck portion of a CRT (symbolically represented). In the preferred applications, the CRT is part of a television receiver or a computer monitor. The deflection yoke 10 is connected in series-circuit through a horizontal linearity coil 12 to circuit ground through a voltage source 14. The other end of the deflection yoke 10 is typically connected to horizontal sweep/scan circuitry, represented in generic fashion at 16. The horizontal sweep/scan circuits 16, as is known in the art, can include automatic gain and frequency/phase control circuits and will typically also include one or more high-voltage circuits that are used by the display tube (not shown). In the case of a television receiver operating on the NTSC standard, the horizontal sweep frequency will be 15,750 Hz. In the case of a computer monitor, the horizontal frequency can be in the area of 50–80 KHz. A linearity correction coil 18 is connected in parallel to the horizontal linearity coil 12 and is used to selectively alter the inductance of the horizontal linearity coil 12 to change or alter one or more features of the waveform that passes through the deflection yoke 10.

As shown, the linearity correction coil 18 has an input coil 20 cross-coupled to an output coil 22 through a core 24; the structure and organization of the coil 18 is a known prior-art structure. The output coil 22 is connected in parallel with the horizontal linearity coil 12 while the input coil 20 is connected between the control node 26 and the circuit ground so that a control current i can flow between the control node 26 and the circuit ground as a function of a voltage presented to the control node 26.

In normal operation, any change in current flow through the linearity correction coil 18 will affect the inductance of the parallel-connected horizontal linearity coil 12 and thus alter the horizontal waveform through the deflection yoke 10. Current control through the input coil 20 of the linearity correction coil 18 can take one of several forms depending upon the particular display. In FIG. 1, a controller 28 takes the form of a programmed microprocessor 30, PLA, or similar device that includes a memory 32 that communicates with the microprocessor 30 through an address bus 34 and a data bus 36. As can be appreciated, all components of the controller 28 can be integrated onto a single chip. The memory 32 contains digital correction factors that are stored as a function of the forward left-to-right scan position of the electron beam as it sweeps from the left side to the right side of the screen. The microprocessor 30, in direct or indirect response to a start command, $H_{sync}$, addresses the memory 32 in a recurring manner to access the correction factor information. The information in the memory 32 can be organized as a look-up table in which a digital correction factor can be stored as a function of the horizontal sweep position of the electron beam. Since traditional pincushion effects are also a function of the vertical position of the electron beam, a vertical input 'VERT' to the controller 28 allows for correction of each horizontal sweep for each vertical position (i.e., each line). Since the classic television CRT uses a 525 line interlaced frame, the look-up table can include correction factors that are a function of the horizontal position of the electron beam for each of the 525 lines. In the case of a television receiver that conforms to the NTSC standard, the sync pulse $H_{sync}$ directly or indirectly starts an operating cycle of the controller 28 in which successive correction factors at specific and successive addresses are accessed as the electron beam sweeps left to right and from the top of the display screen to the bottom with these successive correction factors undergoing conversion to an analog value in a converter 38. The output of the converter 38 is provided as a control voltage to the control node 26 with the resulting current through the input coil 20 of the linearity correction coil 18 affecting the inductance of the output coil 22. A shown, the converter 38 can be integrated into the microprocessor 30 as an on-chip converter. For television receivers, the operating cycle will be synchronized with and recur at the 1.575 KHz horizontal drive frequency.

In the case of multi-frequency monitors used with computers, the controller 28 can include an input(s) that can be used to identify different scan frequencies. That is and as shown in FIG. 1, different inputs $SF_1$, $SF_2$, $SF_3$, . . . , $SF_n$, can be enabled for different available scan (sweep) frequencies. Accordingly, the memory 32 can include different look-up tables, each associated with a particular scanning frequency and including correction factors unique to that particular scanning frequency.

The correction factors to be stored in the memory 32 are determined empirically based upon observations of the displayed image. In the case of a NTSC television receiver, a correction factor for each line is determined and stored in the memory 32 for line-by-line correction. In the case of a multi-frequency computer monitor, correction factors for the display at each of the available sweep frequencies can be stored with the appropriate portion of the memory 32 accessed as a function of the scanning frequency as well as on a line-by-line basis.

Figure 2:
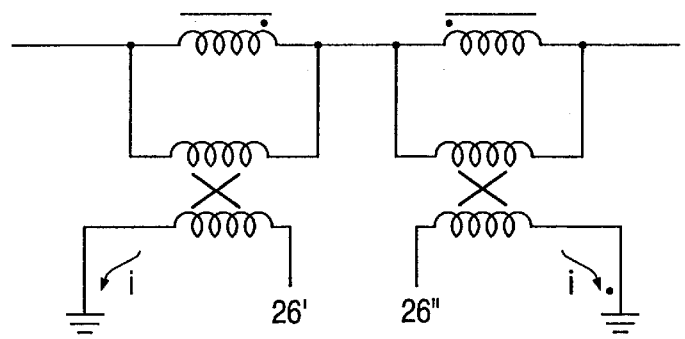
FIG. 2 is a circuit diagram of two, serially-connected inductance controlled coils.

As shown in FIG. 2, a plurality of linearity correction coils 18 can be series connected in opposition and individually controlled to achieve a desired control function. In the case of the arrangement of FIG. 2, one of the linearity correction coils 18 can be a relatively large inductor and the other of the linearity correction coils 18 can be a smaller inductor so that large changes in inductance with relatively high resolution can be achieved.

Figure 3:
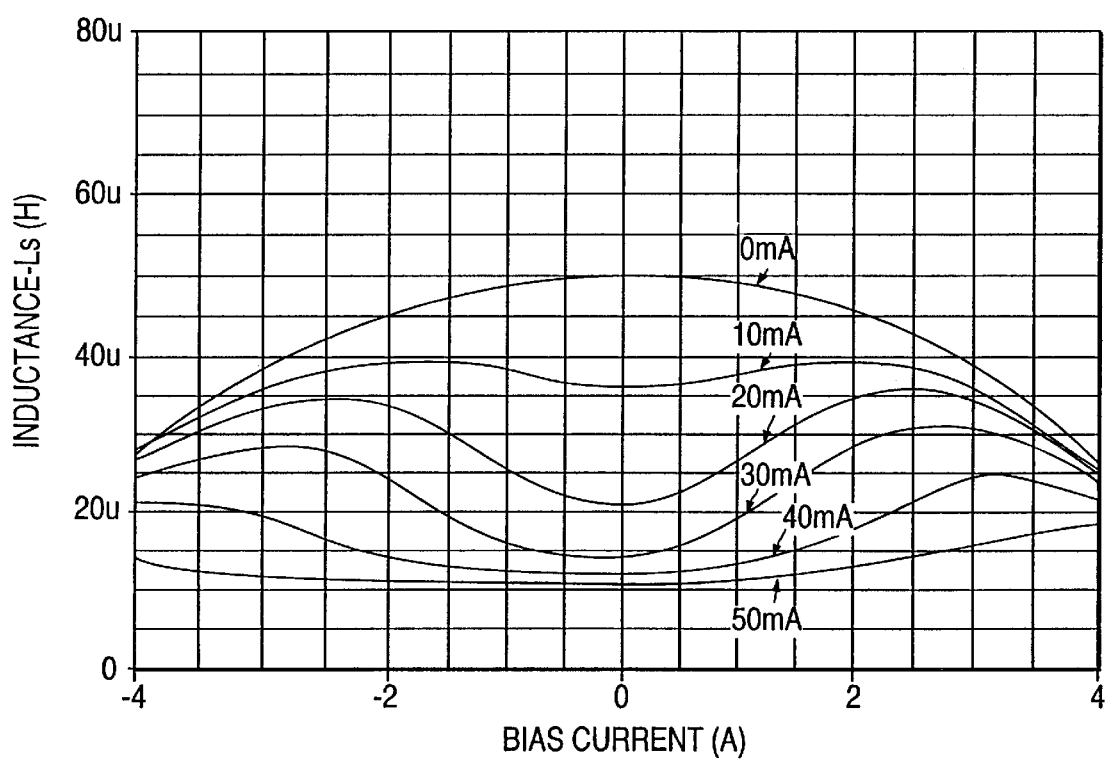
FIG. 3 is a representative plot showing horizontal deflection current (in A) as a function of inductance ($\mu$H) for various control currents (mA) for the circuit of FIG. 1.

FIG. 3 is a representative plot showing horizontal deflection current (in A) as a function of inductance ($\mu$H) for various control currents (mA).

The present invention advantageously provides waveform correction using an inductance-controllable inductor suitable for use in the horizontal sweep circuits of television displays and in the horizontal scan circuits of multi-frequency computer monitors to allow for correction on non-linearities in the waveform.

As will be apparent to those skilled in the art, various changes and modifications may be made to the illustrated waveform correction system of the present invention without departing from the spirit and scope of the invention as determined in the appended claims and their legal equivalent.

What is claimed is:

1. A waveform correction circuit for use in controlling the horizontal sweep waveform of a raster-type CRT display of the type having a deflection yoke for deflecting an electron beam in response to the horizontal sweep waveform and having a correction inductor in circuit with a deflection yoke, comprising:

a first inductor in circuit with the correction inductor;

a second inductor magnetically coupled to said first inductor;

means for varying the current flow through said second inductor to change the inductance of said first inductor and the connected correction inductor in response to the current flow through said second inductor, said means including a memory having a plurality of uniquely addressable correction values stored therein for correcting the horizontal sweep waveform as a function of the horizontal sweep position of the electron beam.

2. The waveform correction circuit of claim 1, wherein said memory includes a plurality of uniquely addressable correction values stored therein for correcting the horizontal sweep waveform as a function of the vertical-line position of the electron beam.

3. The waveform correction circuit of claim 1, wherein said memory includes a plurality of uniquely addressable correction values stored therein for correcting the horizontal sweep waveform at different horizontal sweep frequencies.

4. A waveform correction circuit for use in controlling the horizontal sweep waveform of a raster-type CRT display of the type having a deflection yoke for deflecting an electron beam in response to the horizontal sweep waveform and having a correction inductor in series circuit with the deflection yoke, comprising:

a first inductor in circuit with the correction inductor;

a second inductor magnetically coupled to said first inductor;

a controller for varying the current flow through said second inductor to change the inductance of said first inductor and the connected correction inductor in response to the current flow through said second inductor, said controller including a memory having a plurality of uniquely addressable correction values stored therein for correcting the horizontal sweep waveform as a function of the horizontal sweep position of the electron beam.

5. The waveform correction circuit of claim 4, wherein said memory includes a plurality of uniquely addressable correction values stored therein for correcting the horizontal sweep waveform as a function of the vertical-line position of the electron beam.

6. The waveform correction circuit of claim 4, wherein said memory includes a plurality of uniquely addressable correction values stored therein for correcting the horizontal sweep waveform at different horizontal sweep frequencies.

7. A waveform correction circuit for use in controlling the horizontal sweep waveform of a raster-type CRT television display of the type having a deflection yoke for deflecting an electron beam from one side of the display surface to another side on a line-by-line basis in response to a horizontal sweep waveform and having a correction inductor in circuit with the deflection yoke, comprising:

a first inductor in circuit with the correction inductor;

a second inductor magnetically coupled to said first inductor;

a controller for varying the current flow through second inductor to change the inductance of said first inductor in response to the current flow said in second inductor, said controller including a memory having a plurality of uniquely addressable correction values stored therein for correcting the horizontal sweep waveform as a function of the horizontal sweep position of the electron beam.

8. The waveform correction circuit of claim 7, wherein said memory includes a plurality of uniquely addressable correction values stored therein for correcting the horizontal sweep waveform as a function of the vertical-line position of the electron beam.

9. A waveform correction circuit for use in controlling the horizontal sweep waveform of a raster-type CRT display of the type having a deflection yoke for deflecting an electron beam from one side of the display surface to another side thereof on a line-by-line basis in response to one of a set of horizontal scan frequencies and a correction inductor in circuit with the deflection yoke, comprising:

a first inductor in circuit with the correction inductor;

a second inductor magnetically coupled to said first inductor;

a controller for varying the current flow through the second inductor to change the inductance of said first inductor in response to the current flow in said second inductor, said controller including a memory having a plurality of uniquely addressable correction values stored therein for correcting the horizontal sweep waveform at a selected horizontal frequency as a function of the horizontal sweep position of the electron beam.

10. The waveform correction circuit of claim 9, wherein said memory includes a plurality of uniquely addressable correction values stored therein for correcting the horizontal sweep waveform as a function of the vertical-line position of the electron beam.

11. A method of correcting the horizontal sweep waveform in a raster-type CRT display of the type having a deflection yoke for deflecting an electron beam in response to the horizontal sweep waveform and having a correction inductor in circuit with the deflection yoke, comprising the steps of:

inserting a first inductor in circuit with the correction inductor;

magnetically coupling a second inductor to said first inductor; and varying the current flow through the second inductor to change the inductance of said first inductor and the connected correction inductor in response to the current flow in said second inductor through a controller, said controller including a memory having a plurality of uniquely addressable correction values store therein to correct the horizontal sweep waveform at a selected horizontal frequency as a function of the horizontal sweep position of the electron beam.

12. A television receiver of the type having a CRT for displaying a raster-form image, the receiver having circuitry for processing a video signal to drive the CRT to present an image thereon, the receiver including a deflection yoke associated with the CRT for deflecting an electron beam from one side of the CRT display surface to another side on a line-by-line basis in response to a horizontal sweep waveform, the receiver including a waveform correction circuit having a correction inductor in circuit with the deflection yoke for controlling the horizontal sweep waveform, comprising:

a first inductor in circuit with the correction inductor;

a second inductor magnetically coupled to said first inductor;

a controller for varying the current flow through second inductor to change the inductance of said first inductor in response to the current flow in said second inductor, said controller including a memory having a plurality of uniquely addressable correction values stored therein for correcting the horizontal sweep waveform as a function of the horizontal sweep position of the electron beam.

13. The television receiver circuit of claim 12, wherein said memory includes a plurality of uniquely addressable correction values stored therein for correcting the horizontal sweep waveform as a function of the vertical-line position of the electron beam.

14. A CRT-type monitor for displaying a raster-form image output from a computer, the monitor having circuitry for processing a video signal from the computer to drive the CRT to present an image thereon, the monitor including a deflection yoke associated with the CRT for deflecting an electron beam from one side of the CRT display surface to another side on a line-by-line basis in response to a horizontal sweep waveform, the monitor including a waveform correction circuit having a correction inductor in circuit with the deflection yoke for controlling the horizontal sweep waveform, comprising:

a first inductor in circuit with the correction inductor;

a second inductor magnetically coupled to said first inductor;

a controller for varying the current flow through second inductor to change the inductance of said first inductor in response to the current flow said in second inductor, said controller including a memory having a plurality of uniquely addressable correction values stored therein for correcting the horizontal sweep waveform as a function of the horizontal sweep position of the electron beam.

15. The CRT-type monitor of claim 14, wherein said memory includes a plurality of uniquely addressable correction values stored therein for correcting the horizontal sweep waveform as a function of the vertical-line position of the electron beam.

16. The CRT-type monitor of claim 14, wherein said memory includes a plurality of uniquely addressable correction values stored therein for correcting the horizontal sweep waveform at different horizontal scan frequencies.

* * * * *